(12) United States Patent
Guanzon et al.

(10) Patent No.: US 7,976,095 B2
(45) Date of Patent: Jul. 12, 2011

(54) INTEGRATED SWITCH MOUNT AND HARNESS HOOK

(75) Inventors: Ruben Guanzon, Powell, OH (US); Haithi Donahue-Yan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 11/848,514

(22) Filed: Aug. 31, 2007

(65) Prior Publication Data
US 2009/0058129 A1 Mar. 5, 2009

(51) Int. Cl.
*B60J 5/04* (2006.01)
(52) U.S. Cl. .................. 296/146.7; 296/146.5; 296/152; 296/153
(58) Field of Classification Search ............... 296/146.7, 296/146.5, 152, 153; *B60J 5/04*
See application file for complete search history.

(56) References Cited

U.S. PATENT DOCUMENTS

| | | | |
|---|---|---|---|
| 2,703,662 A | | 3/1955 | Meyer |
| 2,931,851 A | * | 4/1960 | Sims ........................ 174/72 A |
| 3,725,848 A | | 4/1973 | Davidson |
| 4,907,836 A | * | 3/1990 | Ueda et al. .................. 296/39.1 |
| 4,967,045 A | | 10/1990 | Keefer |
| 5,460,530 A | * | 10/1995 | Toba et al. ..................... 439/34 |
| 5,735,041 A | | 4/1998 | Zaguskin et al. |
| 5,846,091 A | * | 12/1998 | Nishijima et al. ............. 439/34 |
| 6,000,949 A | * | 12/1999 | Takiguchi et al. ............. 439/34 |
| 6,079,765 A | * | 6/2000 | Zaguskin et al. .......... 296/146.1 |
| 6,139,088 A | * | 10/2000 | Okamoto et al. ......... 296/146.6 |
| 6,423,916 B1 | | 7/2002 | Koebrick |
| 7,051,438 B2 | * | 5/2006 | O'Brien et al. ............. 29/897.2 |
| 2006/0189193 A1 | * | 8/2006 | Yamamoto .................. 439/290 |

* cited by examiner

*Primary Examiner* — Glenn Dayoan
*Assistant Examiner* — SunSurraye Westbrook
(74) *Attorney, Agent, or Firm* — Mark E. Duell, Esq.; Emerson Thomson Bennett

(57) ABSTRACT

A single-piece switch mount and harness hook that provides routing control of an interior vehicle door harness.

20 Claims, 15 Drawing Sheets

ID SWITCH MOUNT AND
HARNESS HOOK

I. BACKGROUND OF THE INVENTION

A. Field of Invention

This invention pertains to the art of methods and apparatuses regarding the manufacture and assembly of automobiles, and more particularly to methods and apparatuses regarding the manufacture and assembly of vehicle door assemblies.

B. Description of the Related Art

A vehicle door frequently houses numerous electrical components and devices for carrying out various tasks and operations. For example, the vehicle door may include a power window control assembly, a power door locking mechanism, and a fuel lid switch for opening or releasing the vehicle's fuel access door. Typically, a plurality of electrical wires are routed within the interior space of the vehicle door, between the outer and inner panels, for connecting the various electrical components to their respective switches, control units, power sources and the like. It is known to pre-assemble these electrical wires into one or more wire harnesses. These wire harnesses facilitate the installation, connection, and protection of the individual wires of which they are composed. The wire harness may be separated into a main cable and one or more branch cables or wire harness extensions. The harness extensions allow a wire or group of wires to branch from the main cable and connect to a particular electrical component.

It is known to secure or attach the main cable portion of the wire harness as well as the harness extensions to an interior portion of a vehicle door. A loose or unsecured wire harness may cause a striking or rattling noise generated by the wire harness contacting adjacent portions of the vehicle door. The striking noise may be caused by the vibration of the vehicle body during normal operation of the vehicle. Further, the continued contact of the wire harness against the interior of the vehicle door may cause the wire harness to become damaged and subsequently repaired or replaced.

Known methods for securing or attaching a wire harness to the interior portions of a vehicle door include the use of a two-piece device comprising a housing assembly, commonly referred to as a doghouse, and a harness hook or other type of clip. Typically, the housing assembly is inserted into a mating hole formed on an inside portion of the interior door. A harness hook or other type of clip is then attached to the housing assembly. Conventional harness hooks require that some interior door structure or component be present in order to attach the hook. Additionally, the housing assembly requires an additional amount of space to be present.

The space available in the interior portion of a vehicle door for mounting the various electrical components and for securing the associated wire harnesses is extremely limited. Further, auto manufacturers are commonly including an interior pocket in the lower portions of the vehicle door adjacent to the door's audio speaker. It is known to design the interior pocket so that the pocket portion is encompassed within the vehicle door. Additionally, a fuel lid switch is included in the inner pocket portion. This fuel lid switch is electrically connected using a wire harness or harness extension. The limited amount of space in this portion of the vehicle door prevents the use of a conventional housing assembly and harness hook and requires that the wire harness or harness extension be secured at some distance from the fuel lid switch and switch mount. Often, the interior portion of the vehicle door is comprised such there is not an interior door panel or other door frame component in close proximity to the fuel lid switch. This extended distance at which the conventional wire harness fasteners must be placed allows for an extended length of wire harness or harness extension to be loose or relatively unsecured between the fastener and the fuel lid switch. This loose or unsecured condition promotes the striking or rattling noise previously described.

Although known methods for attaching a switch mount to a vehicle door work well for their intended purpose, several disadvantages, as discussed above, exist. What is needed then is a wire harness attachment device that allows the wire harness that extends to a fuel lid switch located in the interior pocket of a vehicle door to be secured in close proximity to the fuel lid switch in order to prevent the wire harness from creating a striking or rattling noise and from being damaged from contact with the adjacent interior components of the vehicle door.

II. SUMMARY OF THE INVENTION

According to one embodiment of this invention, a method may have the steps of: providing a one-piece device having a first harness hook, a first switch mount, and a connection member; attaching the connection member to a vehicle door assembly; mounting a first switch to the first switch mount; connecting a wire harness to the first switch; and, placing the wire harness within the first harness hook.

According to another embodiment of this invention, a method may have the steps of: providing a one-piece device having a first harness hook, a first switch mount, and a connection member; attaching the connection member to a vehicle door assembly; mounting a fuel lid switch to the first switch mount; connecting a wire harness to the first switch; and, placing the wire harness within the first harness hook.

According to another embodiment of this invention, a method may have the steps of: providing a one-piece device having a first harness hook, a second harness hook, a first switch mount, and a connection member; attaching the connection member to a vehicle door assembly; mounting a first switch to the first switch mount; connecting a wire harness to the first switch; placing the wire harness within the first harness hook; and, placing the wire harness within the second harness hook.

According to another embodiment of this invention, a method may have the steps of: providing a one-piece device having a first harness hook, a first switch mount, a second switch mount, and a connection member; attaching the connection member to a vehicle door assembly; mounting a first switch to the first switch mount; connecting a first wire harness to the first switch; placing the first wire harness within the first harness hook; mounting a second switch to the second switch mount; connecting a second wire harness to the second switch; placing the second wire harness within the second harness hook.

According to another embodiment of this invention, a method may have the steps of: forming a one-piece device having a first harness hook, a first switch mount, and a connection member in a molding process; attaching the connection member to a vehicle door assembly; mounting a first switch to the first switch mount; connecting a wire harness to the first switch; and placing the wire harness within the first harness hook.

According to another embodiment of this invention, a method may have the steps of: providing a one-piece device having a first harness hook, a first switch mount, and a connection member; heat staking the connection member to a vehicle door assembly; mounting a first switch to the first switch mount; connecting a wire harness to the first switch; and placing the wire harness within the first harness hook.

According to one embodiment of this invention, a method may have the steps of: providing a one-piece device having a first harness hook, a first switch mount, and a connection member; attaching the connection member to an inside surface of an inner panel of a vehicle door assembly; mounting a first switch to the first switch mount; connecting a wire harness to the first switch; and, placing the wire harness within the first harness hook.

According to one embodiment of this invention, a method may have the steps of: providing a one-piece device having a first harness hook, a first switch mount, and a connection member; providing a vehicle door assembly having a pocket that has a pocket surface; attaching the connection member to the vehicle door assembly; fastening the one-piece device to the pocket surface; mounting a first switch to the first switch mount; connecting a wire harness to the first switch; and, placing the wire harness within the first harness hook.

According to another embodiment of this invention, a method may have the steps of: providing a one-piece device having a first harness hook, a first switch mount, and a connection member; providing a vehicle door assembly having a pocket that has a pocket surface; attaching the connection member to the vehicle door assembly; fastening the one-piece device to the pocket surface by inserting a fastener through a fastener aperture formed in the one-piece device and into the pocket surface; mounting a first switch to the first switch mount; connecting a wire harness to the first switch; and, placing the wire harness within the first harness hook.

According to one embodiment of this invention, a vehicle may have a passenger compartment having a door opening, a vehicle door assembly used to open and close the door opening, a one-piece device, and a switch. The one-piece device may have a harness hook, a switch mount, and a connection member that is connected to the vehicle door assembly. The switch may be mounted to the switch mount and may have a wire harness that is connected to the switch and that is placed within the harness hook.

According to another embodiment of this invention, a vehicle may have a passenger compartment having a door opening, a vehicle door assembly used to open and close the door opening, a one-piece device, and a fuel lid switch. The one-piece device may have a harness hook, a switch mount, and a connection member that is connected to the vehicle door assembly. The fuel lid switch may be mounted to the switch mount and may have a wire harness that is connected to the fuel lid switch and that is placed within the harness hook.

According to another embodiment of this invention, a vehicle may have a passenger compartment having a door opening, a vehicle door assembly used to open and close the door opening, a one-piece device, and a switch. The one-piece device may have a first harness hook, a second harness hook a switch mount, and a connection member that is connected to the vehicle door assembly. The switch may be mounted to the switch mount and may have a wire harness that is connected to the switch and that is placed within the first harness hook and the second harness hook.

According to another embodiment of this invention, a vehicle may have a passenger compartment having a door opening, a vehicle door assembly used to open and close the door opening, a one-piece device, a first switch and a second switch. The one-piece device may have a harness hook, a first switch mount, a second switch mount, and a connection member that is connected to the vehicle door assembly. The first switch may be mounted to the first switch mount and may have a first wire harness that is connected to the first switch and is placed within the harness hook. The second switch may be mounted to the second switch mount and may have a second wire harness that is connected to the second switch and placed within the harness hook.

According to another embodiment of this invention, a vehicle may have a passenger compartment having a door opening, a vehicle door assembly used to open and close the door opening, a one-piece device, and a switch. The one-piece device may be formed in a molding process and may have a harness hook, a switch mount, and a connection member that is connected to the vehicle door assembly. The switch may be mounted to the switch mount and may have a wire harness that is connected to the switch and placed within the harness hook.

According to one embodiment of this invention, a vehicle may have a passenger compartment having a door opening, a vehicle door assembly used to open and close the door opening, a one-piece device, and a switch. The one-piece device may have a harness hook, a switch mount, and a connection member that is heat staked to the vehicle door assembly. The switch may be mounted to the switch mount and may have a wire harness that is connected to the switch and placed within the harness hook.

According to another embodiment of this invention, a vehicle door assembly may have a door body, an inner panel having an inside surface, a one-piece device, and a switch. The one-piece device may have a harness hook, a switch mount, and a connection member that is connected to the inside surface of the inner panel. The switch may be mounted to the switch mount and may have a wire harness that is connected to the switch and that is placed within the harness hook.

According to another embodiment of this invention, a vehicle door assembly may have a door body, a pocket having a pocket surface, a one-piece device, and a switch. The one-piece device may have a harness hook, a switch mount, and a connection member that is connected to the vehicle door assembly. Additionally, the one-piece device is fastened to the pocket surface of the pocket. The switch may be mounted to the switch mount and may have a wire harness that is connected to the switch and that is placed within the harness hook.

According to another embodiment of this invention, a vehicle door assembly may have a door body, a pocket having a pocket surface, a one-piece device, and a switch. The one-piece device may have a harness hook, a switch mount, a fastener aperture, and a connection member that is connected to the vehicle door assembly. The one-piece device may be fastened to the pocket surface of the pocket by inserting a fastener through the fastener aperture. The switch may be mounted to the switch mount and may have a wire harness that is connected to the switch and that is placed within the harness hook.

According to one embodiment of this invention, a vehicle door assembly may have a door body, an inner panel, and a one-piece device. The one-piece device may have a harness hook, a switch mount, and a connection member. The connection member may be connected to the vehicle door assembly. A switch may be mounted to the switch mount. The switch may have a wire harness that is connected to the switch and is placed within the harness hook.

According to another embodiment of this invention, a vehicle door assembly may have a door body, an inner panel, and a one-piece device. The one-piece device may have a harness hook, a switch mount, and a connection member. The connection member may be connected to the inner panel. A switch may be mounted to the switch mount. The switch may have a wire harness that is connected to the switch and is placed within the harness hook.

Another advantage of this invention is that the integrated switch mount and harness hook attachment insures that the routing control device, the harness hook, is located in a position that only a minimal length of harness extends from the harness hook to the switch. This minimal length of harness increases the effectiveness of the harness hook and effectively prevents any rattling or other undesirable noise caused by the harness contacting components of the vehicle door.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
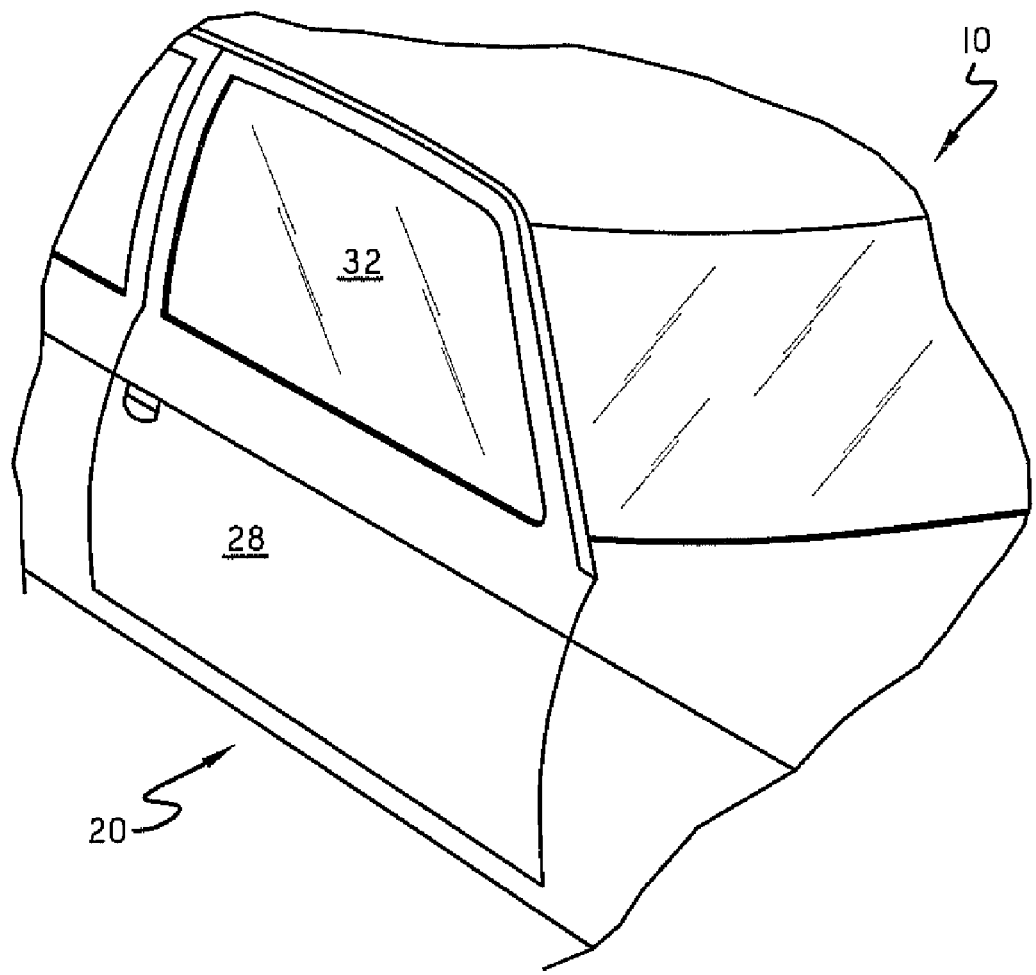
FIG. 1 is a perspective view of a vehicle having a vehicle door according to one embodiment of the invention.
Figure 2:
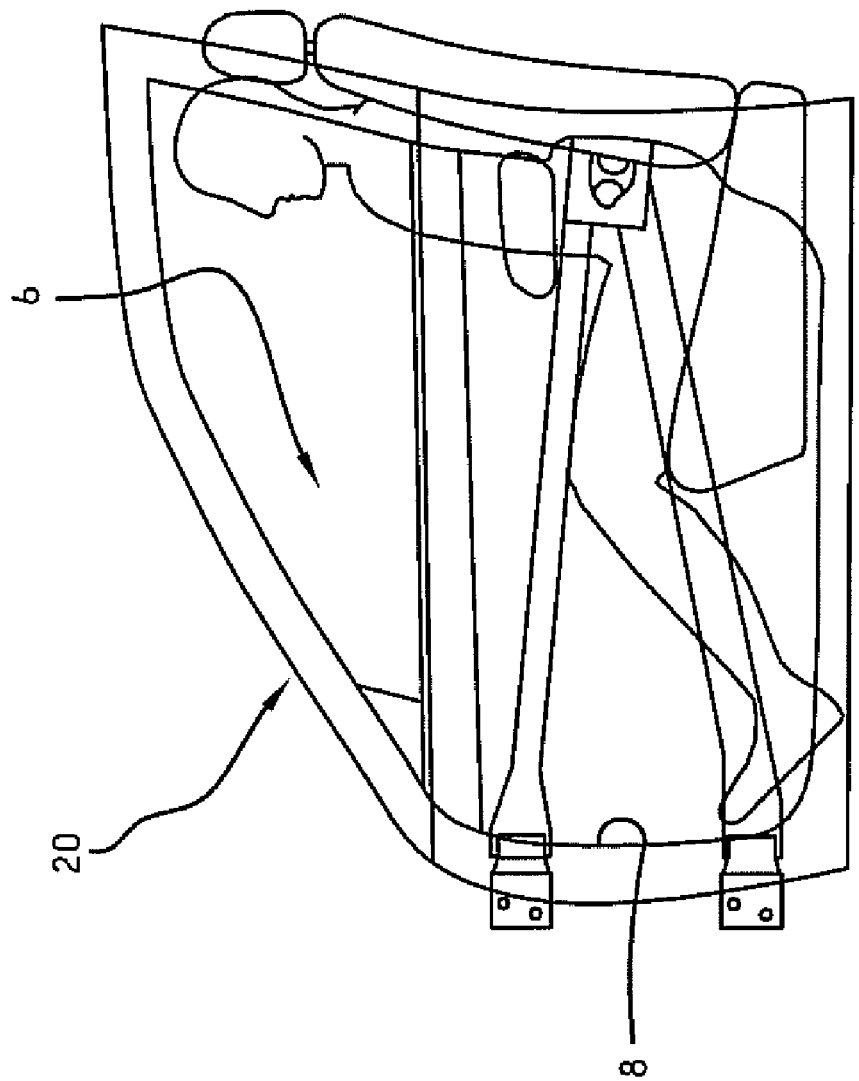
FIG. 2 is a perspective view of a vehicle door and a passenger compartment.
Figure 3:
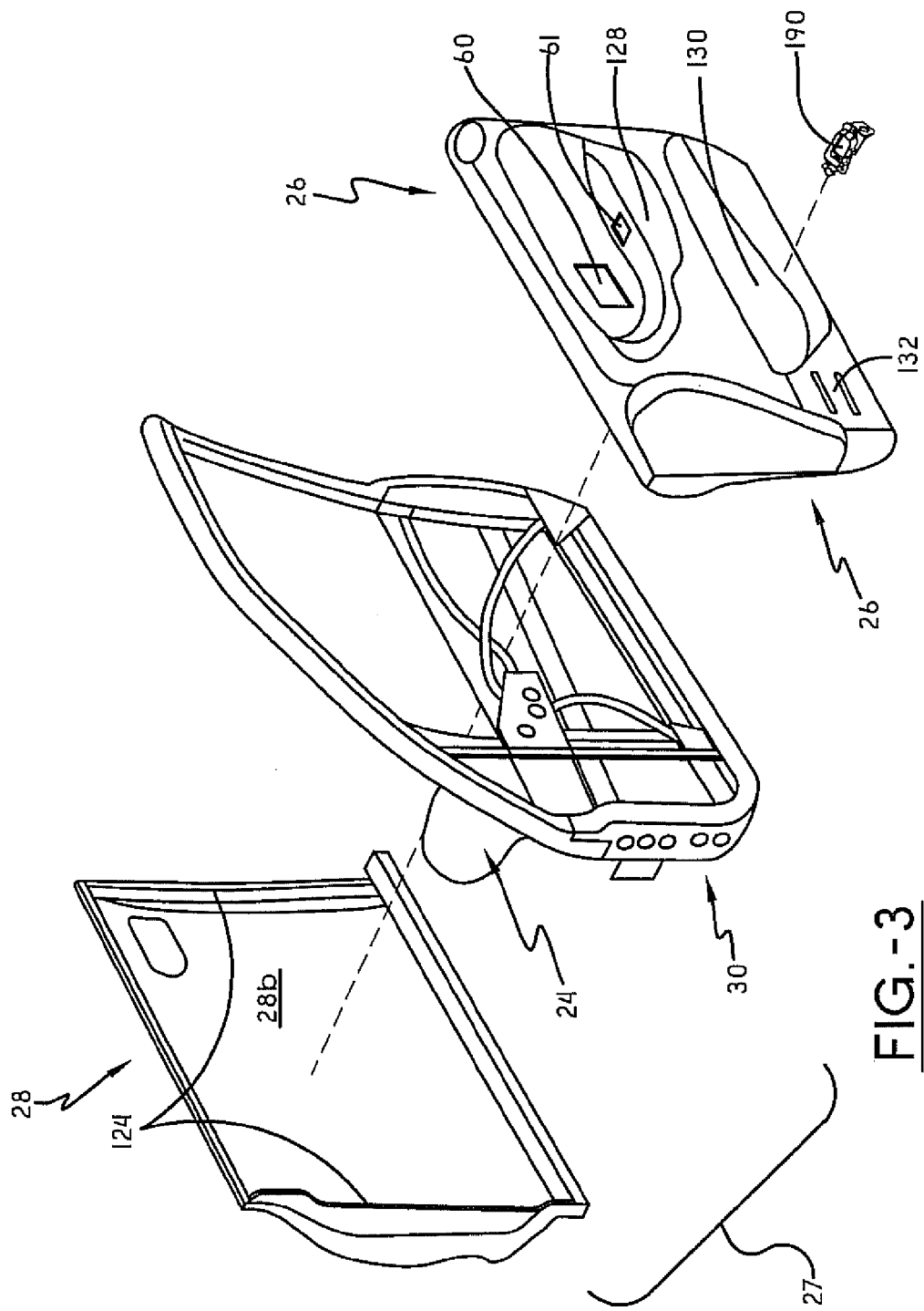
FIG. 3 is an assembly view of a vehicle door showing a door body, an interior panel, and an enlarged view of an integrated switch mount and harness hook attachment according to one embodiment of the invention.

Referring now to the drawings wherein the showings are for purposes of illustrating embodiments of the invention only and not for purposes of limiting the same, FIGS. 1-3 show a vehicle 10 having a vehicle door 20 comprising an integrated switch mount and harness hook attachment device 190 according to one embodiment of the invention. The vehicle door 20 may comprise a door body 27 and an interior or inner panel 26. The vehicle door 20 may be pivotally connected to the vehicle 10 for opening and closing a vehicle door opening 8.

Figure 4:
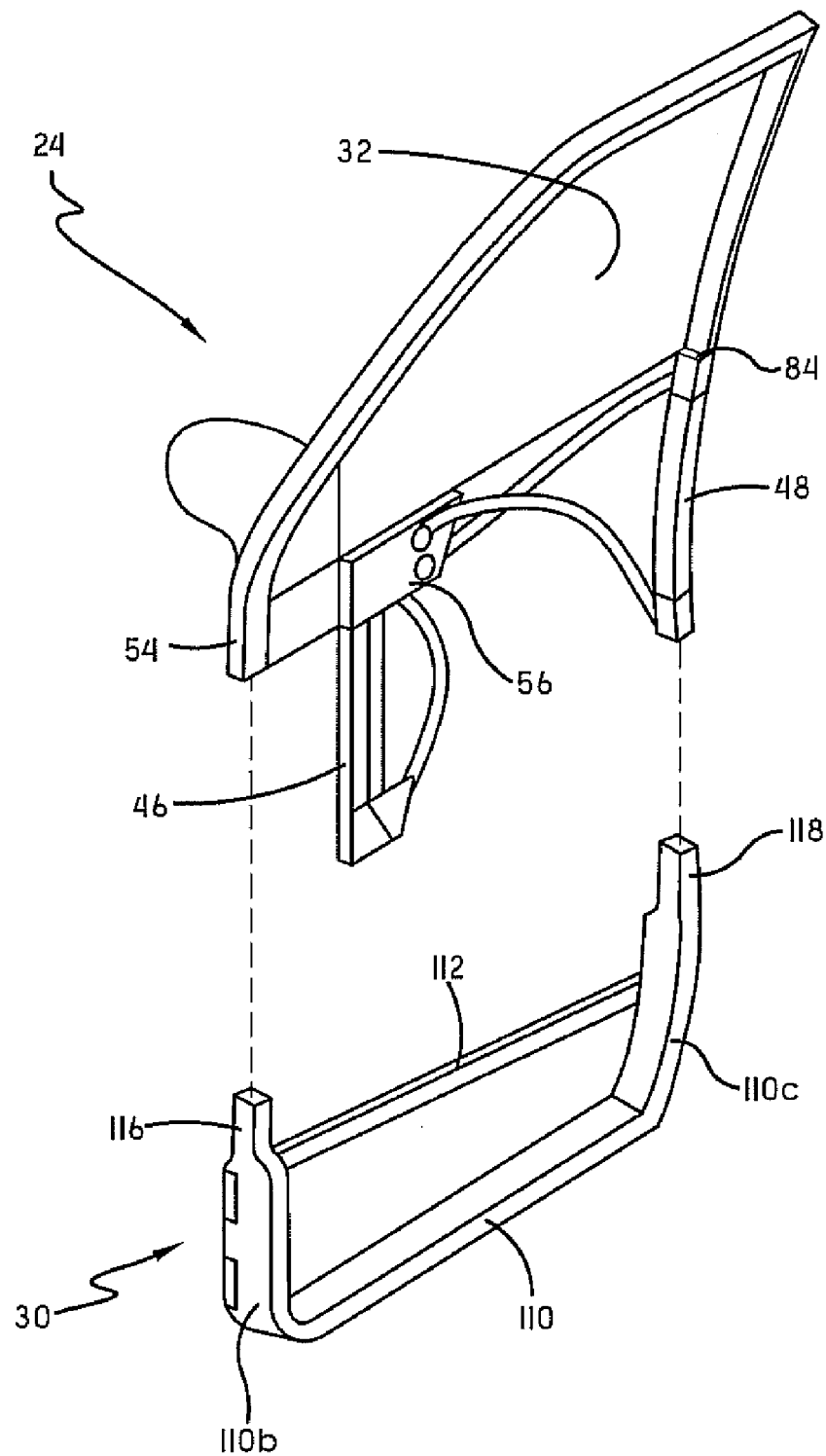
FIG. 4 is an assembly view of a door frame component and a window assembly of the vehicle door shown in FIG. 3.

With reference now to FIGS. 1, 3-4, the door body 27 may comprise an exterior or outer panel 28, a door frame portion 30, and a window assembly 24. The door frame portion 30 may be generally U-shaped and may comprise an elongated base 110, a front upright stem 110*b*, and a rear upright stem 110*c*. The front upright stem 110*b* and the rear upright stem 110*c* may be integral with and extending upwardly from opposite ends of the elongated base 110. The door frame portion 30 may further comprise a horizontal impact beam 112. The horizontal impact beam 112 may extend between the front upright stem 110*b* and the rear upright stem 110*c*. The horizontal impact beam 112 may also serve as a reinforcing member of the door body 27. The window assembly 24 may comprise a windowpane 32; a pair of guide members 46, 48, and a window control assembly 56. The pair of guide members 46, 48 may guide and support the window pane 32 and the window control assembly 56 may control the elevating motion (raising and lowering) of the windowpane 32 along the guide members 46, 48. The outer panel 28 may comprise a panel body that may be curved outwardly, and a pair of vertical end plates 124 that may project from an inside surface (reverse surface) 28*b* of the outer panel 28. The outer panel 28 may be coated or otherwise plated and may comprise the outside surface of the vehicle 10.

With reference now to FIGS. 1-3, 6, the inner panel 26 may comprise the interior wall member that may form the appearance of the interior space or the passenger compartment 6 of the vehicle 10. The inner panel 26 may comprise an armrest 128, an interior pocket portion 130 and a speaker portion 132. The interior pocket portion 130 and the speaker portion 132 may both be positioned below the armrest 128. In one embodiment of the invention, the armrest 128 may comprise a door pull 60 and a switch mount opening 61. The door pull 60 may allow for the manual movement of the vehicle door 20 upon attachment of the inner panel 26 to the vehicle door 20.

Figure 5:
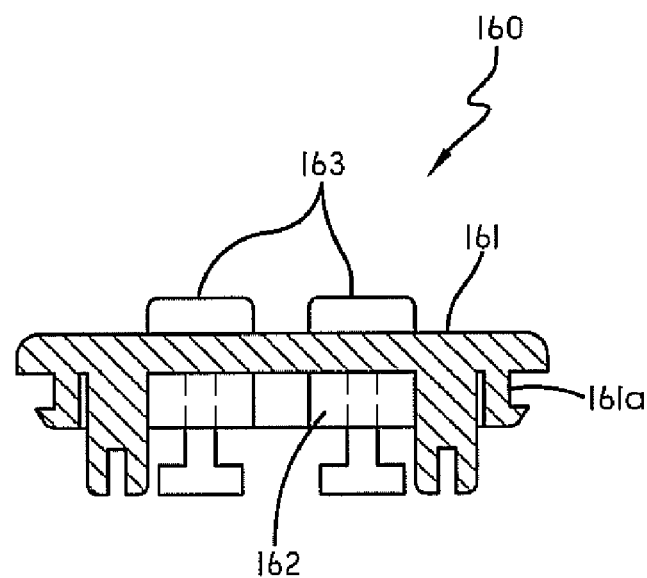
FIG. 5 is an exploded perspective view of an armrest portion of an inner panel of a vehicle door according to one embodiment of the invention.
Figure 5:
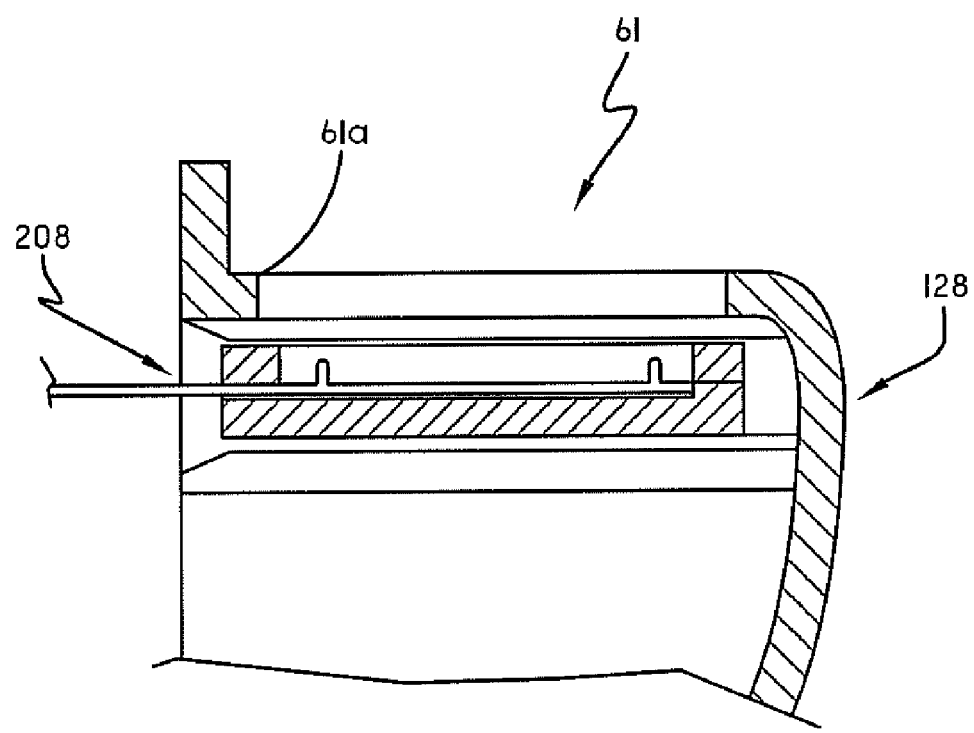

With reference now to FIG. 5, the switch mount opening 61 may be formed on the upper face of the armrest 128. The switch mount opening 61 may receive a main switch unit 160. The main switch unit 160 may comprise a switch casing 161 with an open bottom, and a switch board 162 through which a plurality of operating switches 163 may be mounted. Various switches for operating auxiliary devices, such as the window control assembly 56, may be mounted on the switch board 162. The plurality of operating switches 163 may be mounted so that the plurality of operating switches 163 are exposed to an upper face of the switch casing 161. The switch casing may also comprise elastic lock claws 161*a*. The elastic lock claws may be formed on the outer periphial portion of the switch casing 161 and may engage the peripheral edge 61*a* of the switch mounting opening 61 thereby securing the main switch unit 160 to the armrest 128.

Figure 6:
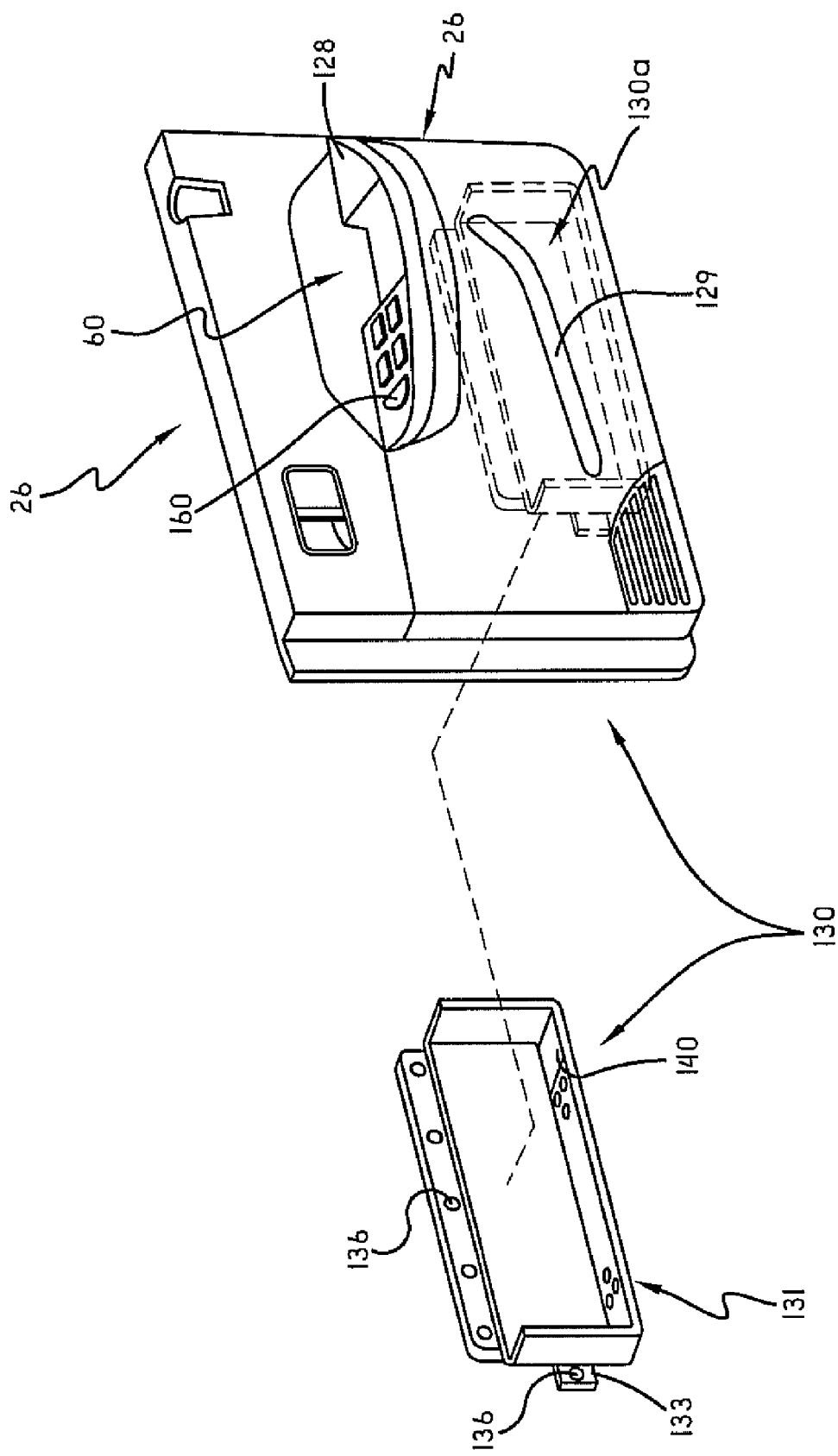
FIG. 6 is an exploded perspective view of an inner panel having an interior pocket portion according to one embodiment of the invention.
Figure 9:
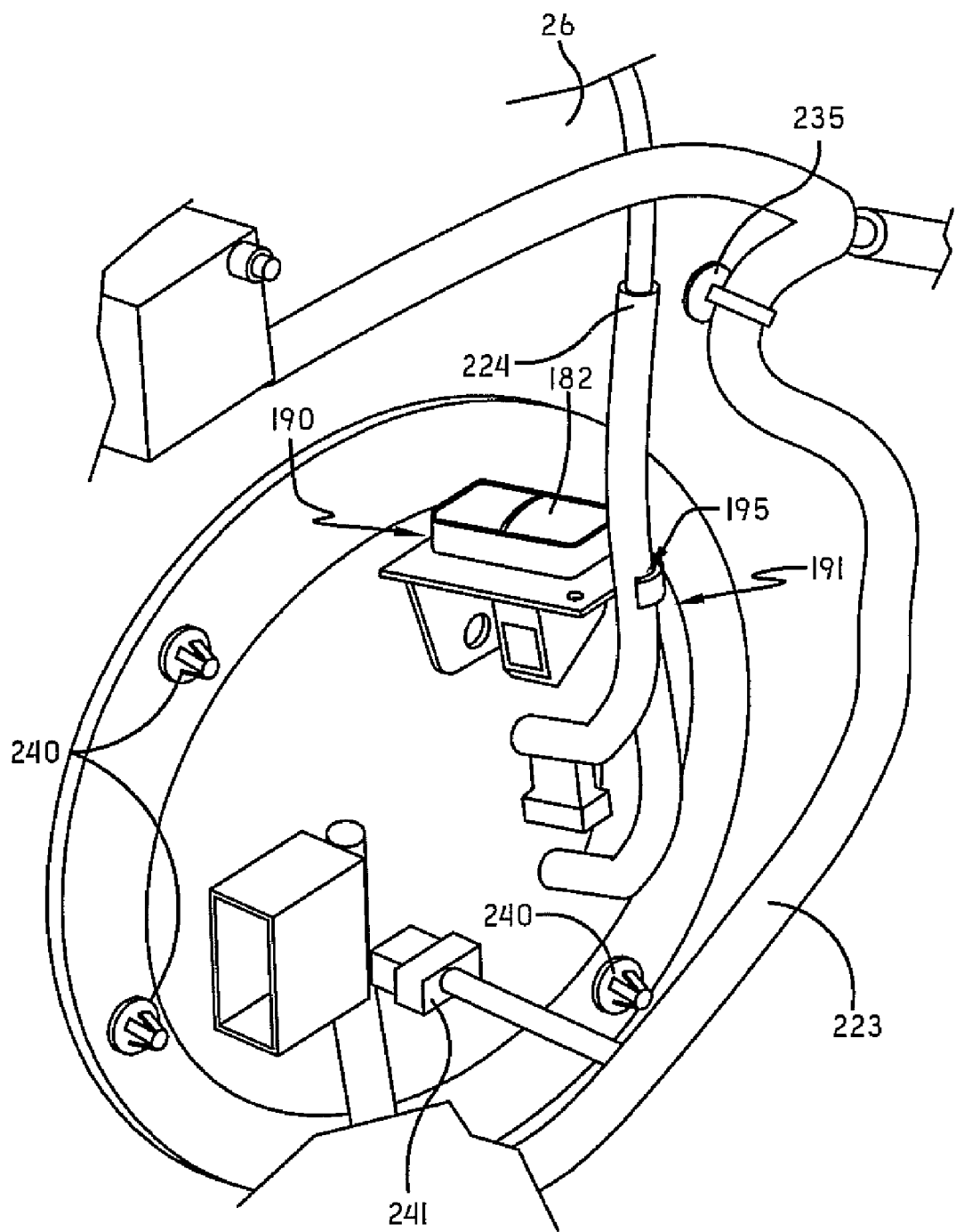
FIG. 9 is a perspective view of an integrated switch mount and harness hook attachment device shown through a transparent inner panel according to one embodiment of the invention.

With reference now to FIGS. 6, 9, the interior pocket portion 130 may be positioned in a lower portion 130a of the inner panel 26. The interior pocket portion 130 may comprise an interior pocket aperture 129 and a pocket back cover 131. The pocket back cover 131 may be formed from a resin molding and may be fitted to the inside surface of the inner panel 26 such that the pocket back cover 131 substantially encloses the interior pocket aperture 129. The pocket back cover 131 may comprise a fuel lid switch aperture 141. The fuel lid switch aperture 141 may receive an integrated switch mount and harness hook attachment device 190 in which a fuel lid switch 182 may be mounted (as shown in FIG. 9).

Figure 10:
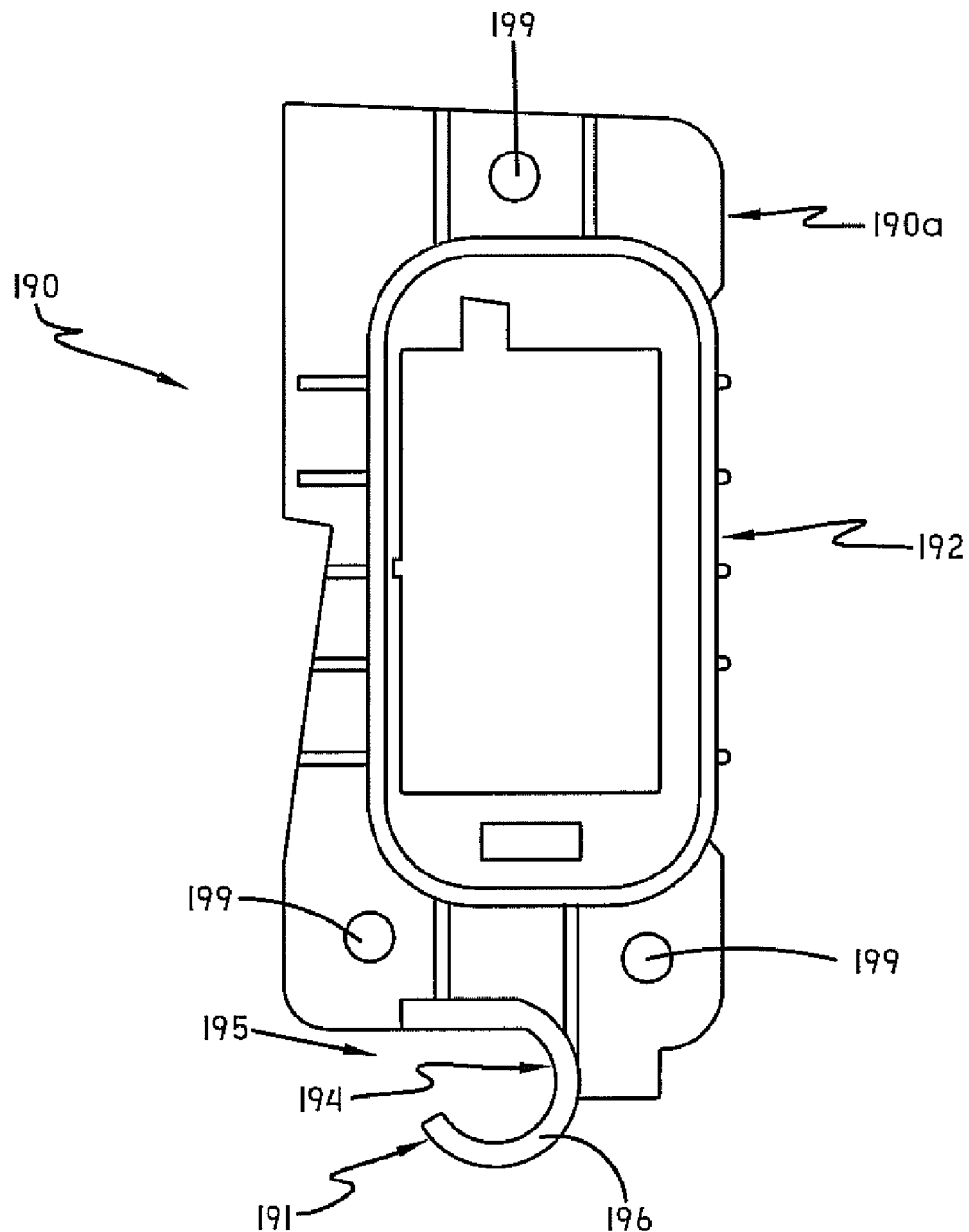
FIG. 10 is a perspective view of an integrated switch mount and harness hook attachment device according to one embodiment of the invention.
Figure 11:
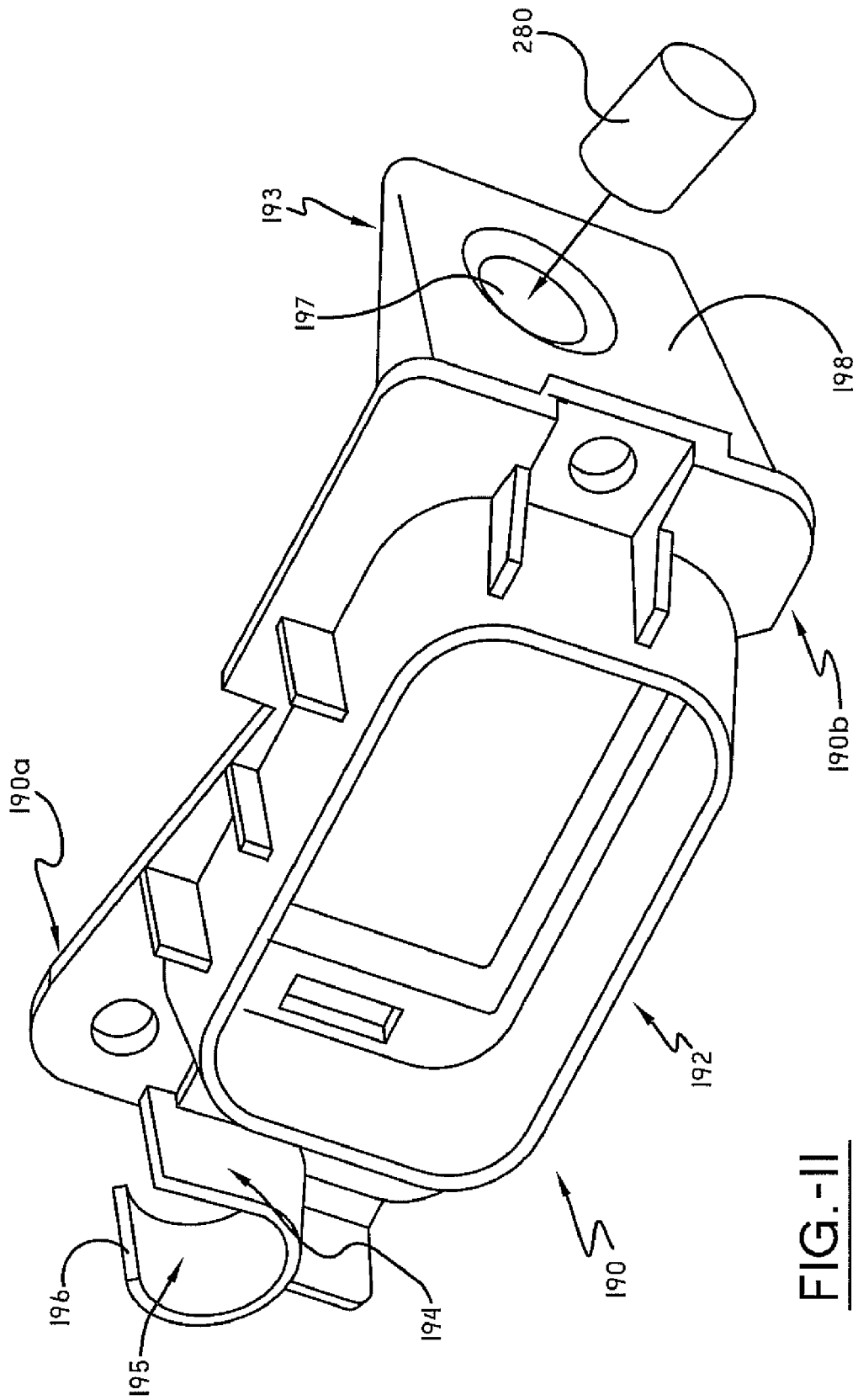
FIG. 11 is a perspective view of the integrated switch mount and harness hook attachment device shown in FIG. 10 at a different angle and shows a heat stake that may be used to connect the integrated switch mount and harness hook attachment device to a vehicle door assembly according to one embodiment of the invention.
Figure 12:
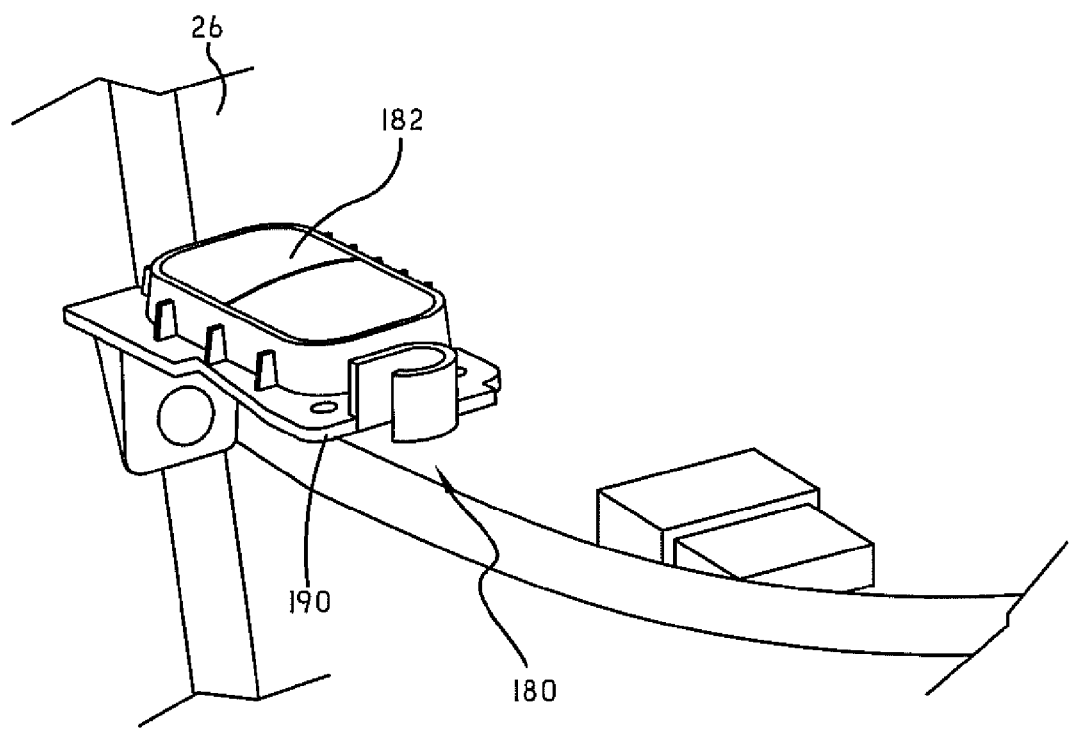
FIG. 12 is a perspective view of an integrated switch mount and harness hook attachment device and inner panel according to one embodiment of the invention.
Figure 13:
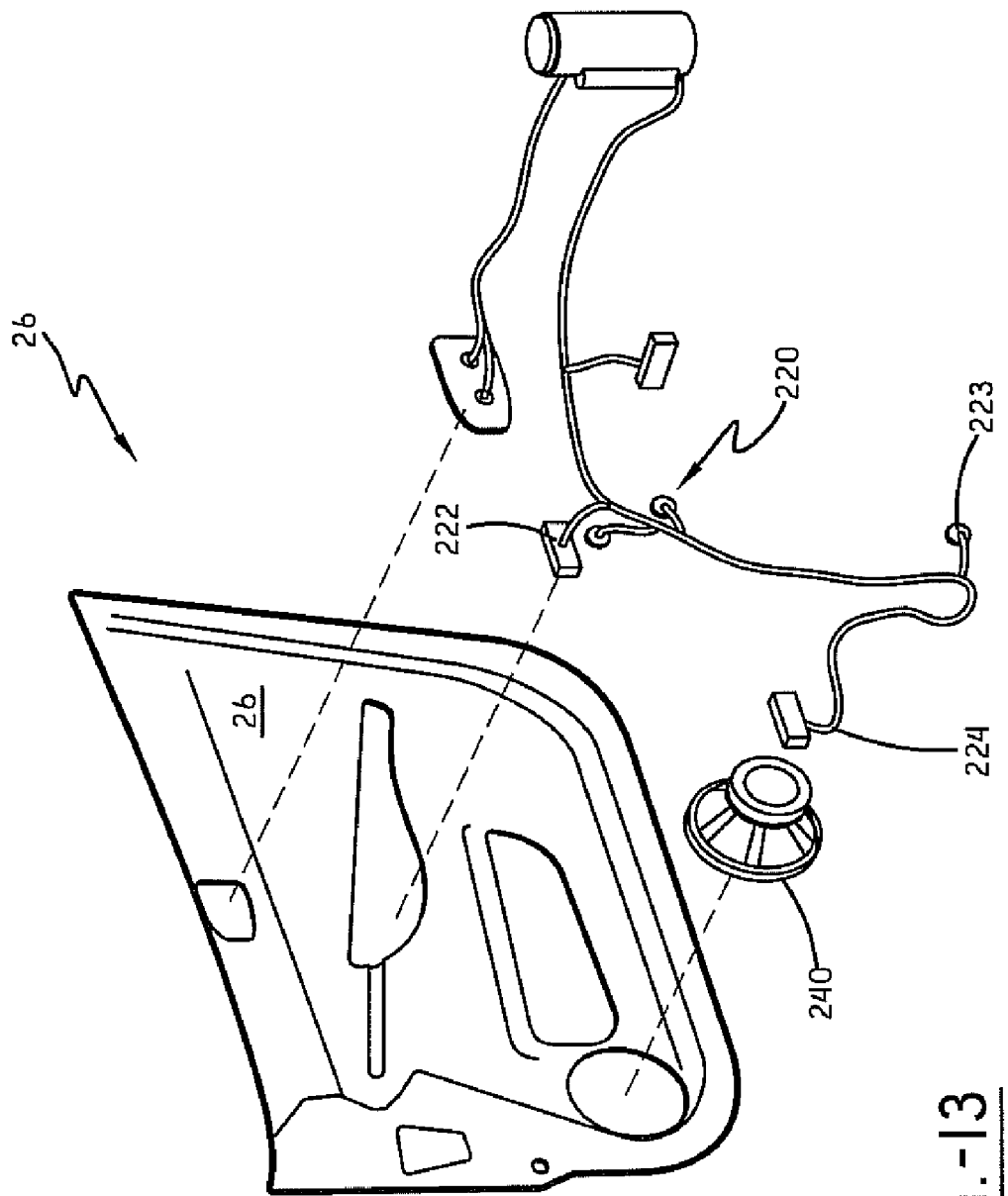
FIG. 13 is a perspective view of an integrated switch mount and harness hook attachment device and inner panel according to one embodiment of the invention.

With reference now to FIGS. 10-12, the integrated switch mount and harness hook attachment device 190 may comprise a harness hook portion 191, a switch mount 192, and a connection member 193 (FIG. 11). In another embodiment of the invention, the integrated switch mount and harness hook attachment device 190 may comprise a second or additional harness hook portions that are substantially similar to the harness hook portion 191. Additionally, the integrated switch mount and harness hook attachment device 190 may comprise a second or additional switch mounts that are substantially similar to the switch mount 192. The integrated switch mount and harness hook attachment device 190 may comprise a synthetic resin, such as a polypropylene. The harness hook portion 191 may be formed at a first end 190A of the integrated switch mount and harness hook attachment device 190 and may be positioned substantially adjacent to the switch mount 192. The harness hook portion 191 may comprise a hook body 194 and an open channel 195. The hook body 194 may comprise a flexible lip 196 that at least partially encircles the open channel 195. As can be seen in FIG. 11, the connection member 193 may be formed at a second end 190B of the integrated switch mount and harness hook attachment device 190 and may also be positioned substantially adjacent to the switch mounting portion 192. The connection member 193 may comprise a panel mating hole 197 and a supporting surface 198. In one embodiment the inside surface of the inner panel 26 may comprise a heat-stake 280. The heat stake may be inserted through the panel mating hole 197. A staking device may then be used to deform the heat stake 280 so that it substantially encapsulates or surrounds the panel mating hole 197 thereby affixing or mechanically coupling the integrated switch mount and harness hook attachment device 190 to the inside surface of the inner panel 26. The integrated switch mount and harness hook attachment device 190 may be attached to the inside surface of the inner panel 26 using any known method chosen with sound engineering judgment.

With reference now to FIGS. 6, 9-10, the fuel lid switch 182 may be received by and attached to the switch mount 192 of the integrated switch mount and harness hook attachment 190. The integrated switch mount and harness hook attachment 190 may then be received by the fuel lid switch aperture 141 such that the fuel lid switch 182 is accessible to a vehicle passenger via the interior pocket aperture 129. The integrated switch mount and harness hook attachment device 190 may further comprise a plurality of fastener apertures 199, for example 3, that may be adjacent to the switch mount 192, for attaching the integrated switch mount and harness hook attachment device 190 to the interior panel 26. The integrated switch mount and harness hook attachment device 190 may be attached to the interior panel 26 using any conventional fastener, for example screws, inserted through the plurality of fastener apertures 199 and into the pocket back cover 131. The fuel lid switch aperture 141 may be positioned anywhere within the interior of or adjacent to the interior pocket portion 130 chosen with sound engineering judgment.

With reference now to FIGS. 1, 3-4, the assembly of a vehicle door 20 according to one embodiment of the invention will be generally described. The individual components of the vehicle door 20, the door body 27 and the inner panel 26 may each be assembled as described above, independently one from the other, and then joined together to form the vehicle door 20. In one embodiment of the invention, the window assembly 24 and the outer panel 28 may be attached to the door frame portion 30 to form the door body 27. The front upright stem 110b and the rear upright stem 110c may comprise a door-frame-front-assembly-attachment portion 116 and a door-frame-rear-assembly-attachment portion 118 respectively. The window assembly 24 may comprise a window-assembly-front-attachment portion 54 and a window-assembly-rear-attachment portion 84. The window-assembly-attachment portions 54, 84 may mate or connect with the door-frame-assembly-attachment portions 116, 118 thereby connecting the window assembly 24 to the door frame portion 30. The window-assembly-attachment portions 54, 84 may mate or connect to the door-frame-assembly-attachment portions 116, 118 using any connection or mating means chosen with sound engineering judgment. In one embodiment of the invention, the window-assembly-attachment portions 54, 84 and the door-frame-assembly-attachment portions 116, 118 may form abutting surfaces that may then be fixedly attached to each other using a conventional fastener such as screws or pop-rivets With reference now to FIGS. 3-4, 8, in one embodiment of the invention, the door body 27 may comprise a component portion 29 (shown in FIG. 8) that is attached to the door frame portion 30. The component portion 29 may allow for the various auxiliary devices, such as the power window control assembly 56, to be pre-assembled onto the component portion 29 and then attached to the door frame portion 30 as a single unit. The component portion 29 may further comprise a control circuit panel 204. The control circuit panel 204 may control the operations of the various auxiliary devices. The control circuit panel 204 may comprise a printed circuit board on which necessary circuit patterns may be printed, and various electronic and electrical parts, forming control circuit sections, may be mounted. In another embodiment, the control circuit panel 204 may be mounted on the door frame portion 27. The control circuit panel 204 may comprise a connector segment 208. The connector segment 208 may allow for the control circuit panel 204 to connect and communicate with the main switch unit 160.

Figure 8:
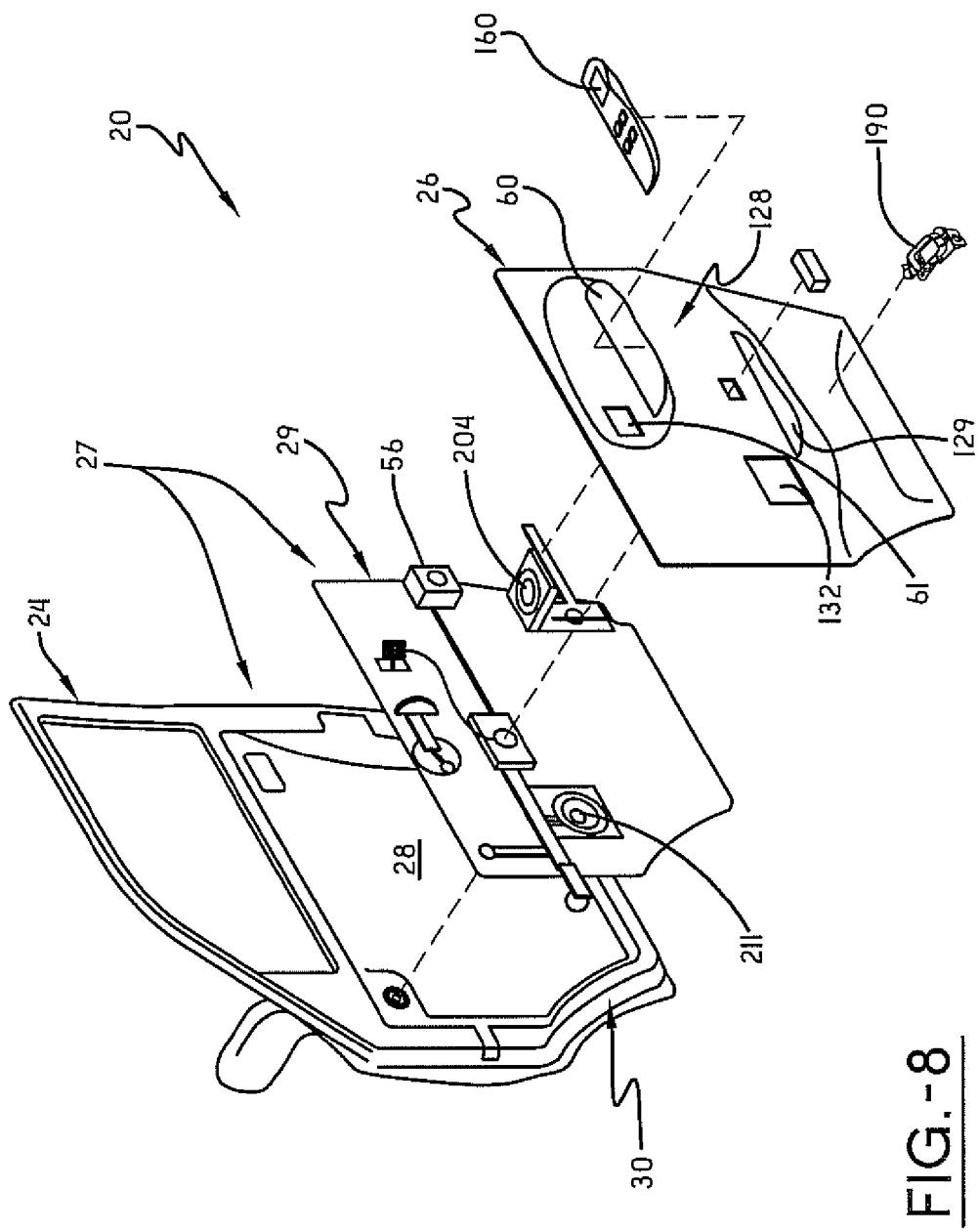
FIG. 8 is a partial assembly view of a vehicle door showing an assembled door body, a component panel, an interior panel, and an enlarged view of an integrated switch mount and harness hook attachment according to one embodiment of the invention.

With reference now to FIGS. 8-9, in one embodiment of the invention, the inner panel 26 may be formed by first attaching the main switch unit 160 to the armrest 128. The main switch portion 160 may be attached to the armrest portion 128 by inserting the main switch emit 160 into the switch mount opening 61. The speaker portion 132 may then be attached to the inner panel 26. The speaker portion may be attached to the inner panel 26 utilizing any known method chosen with sound engineering judgment. In one embodiment, speaker fitting pieces 240, similar to those used to attached the interior pocket portion 130 described below, are used to attach the speaker portion 132 to the inner panel 26.

Figure 7:
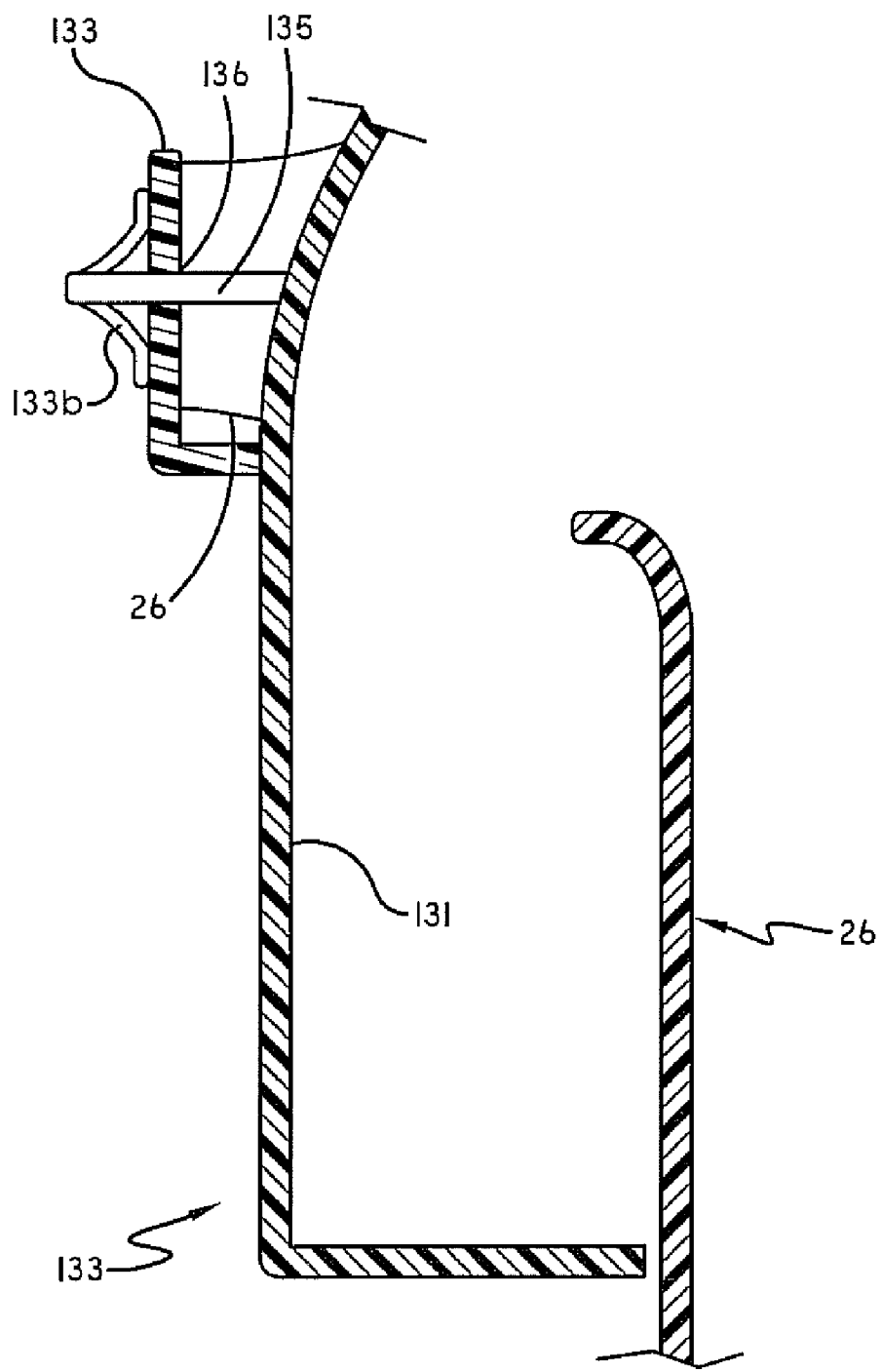
FIG. 7 is a perspective view of an interior pocket portion of an inner panel according to one embodiment of the invention.

With reference now to FIGS. 6-7, 9, the interior pocket portion 130, including the fuel switch 182 and the integrated switch mount and harness hook attachment device 190, previously attached as described above, may be attached to the inner panel 26. In one embodiment of the invention, the pocket back cover 131 of the interior pocket portion 130 may comprise a plurality of fitting pieces 133 that may be disposed at appropriate intervals adjacent to the interior pocket aperture 129. The fitting pieces 133 may each comprise a fitting hole 136. A fitting boss 135 may protrude from the inner surface of the inner panel 26 corresponding to the fitting hole 136 of the fitting piece 133. The fitting boss 135 may be inserted into the fitting hole 136, and may be affixed by applying heat to the fixing boss 135, melting the plastic over the fitting piece 133 through the fitting hole 136. The resultant shape may affix the fitting boss 133b to the fitting piece 133.

With reference now to FIGS. 8-9, 13, 15, an electrical wire harness 220 may be attached to the inner panel 26. The wire harness 220 may comprise a plurality of harness extensions, for example three, an armrest harness extension 222, a speaker harness extension 223, and a fuel lid switch harness extension 224. The armrest harness extension 222 may connect to the control circuit panel 204. A first conventional routing control device 230 (shown in FIG. 15) may be used to secure the armrest harness extension 222 to the inner panel 26. In other embodiments of the invention, the armrest harness extension may be secured to the vehicle body 27. The conventional routing device 230 may comprise a base portion 231 and a hook portion 232. The base portion may be inserted into a mating hole 233 located on the inner panel 26. The hook portion 232 may then be attached to the base portion 231 and the armrest harness extension 222 may be inserted through the hook portion 232 thereby securing, or controlling, the armrest harness extension 222. The speaker harness extension 223 may connect to a speaker connection 241 on the speaker assembly 240. The speaker harness extension 223 may also utilize a second conventional routing control device 235. The second conventional routing device 235 may be utilized in the same fashion as the first conventional routing control device 230. The fuel switch harness extension 224 may extend downward towards the fuel lid switch 182. The fuel switch harness extension 224 may be inserted through the open channel 195 of the harness hook portion 191. The fuel switch harness extension 224 may then extend downward and may be connected to a switch connection portion (not shown) of the fuel lid switch 182. In one embodiment, the fuel lid switch 182 and fuel switch harness extension 224 may be connected using a socket (female connection end) and prong (male connection) end electrical connection assembly.

Figure 14:
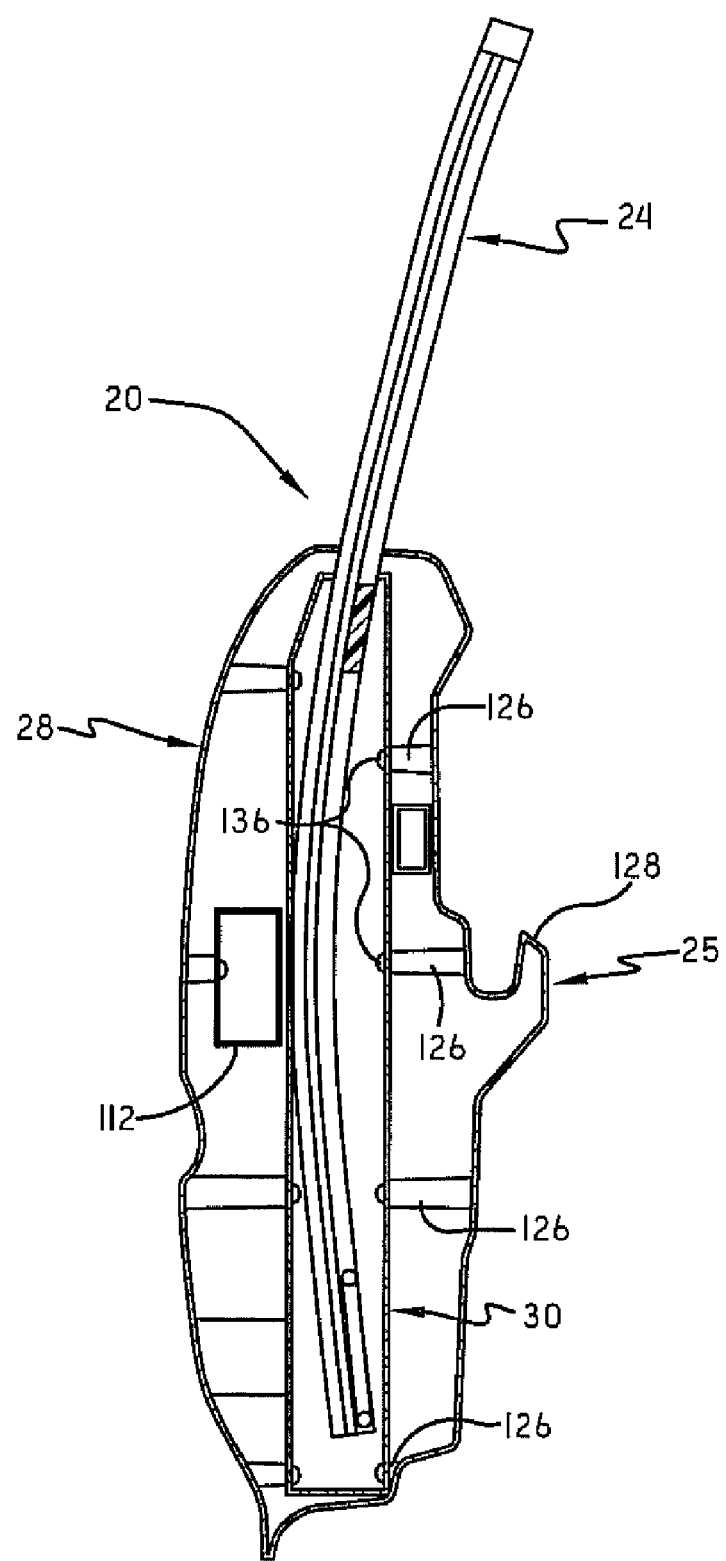
FIG. 14 is an exploded perspective view of an inner panel and wire harness according to one embodiment of the invention.
Figure 15:
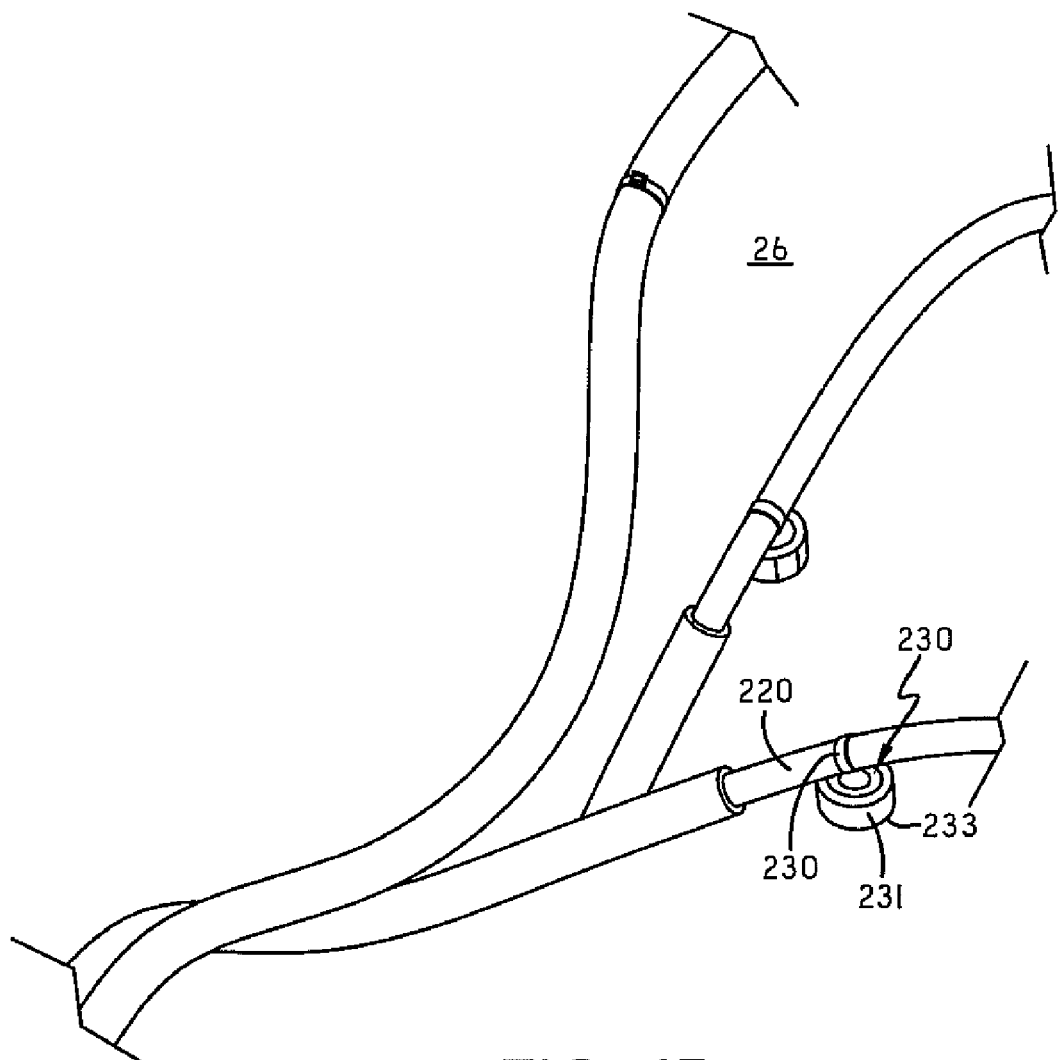
FIG. 15 is a plan perspective view of a vehicle door according to one embodiment of the invention.

With reference now to FIGS. 5, 14, the outer panel 28 may be formed integrally with the door frame member 30. Alternatively, the outer panel 28 may be attached to the door frame member 30 using known methods in the art, such as locking clips, chosen with sound engineering judgment. The inner panel 26 may comprise a plurality of locking projections 126. The plurality of locking projections 126 may be formed integrally with an inside surface (reverse surface) of the inner panel 26 for locking engagement with mating locking holes 136 formed in the door frame member 30. Simultaneously, when the inner panel 26 is attached to the door frame member 30, the connector segment 208 may be connected to the main switch unit 160.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A vehicle comprising:
    a passenger compartment having a door opening;
    a vehicle door assembly used to open and close the door opening;
    a one-piece device comprising:
        (a) a harness hook;
        (b) a switch mount; and
        (c) a connection member that is connected to the vehicle door assembly; and,
    a switch that is mounted to the switch mount, the switch having a wire harness that is connected to the switch and that is placed within the harness hook.

2. The vehicle of claim 1 wherein the switch is a fuel lid switch.

3. The vehicle of claim 1 wherein the one-piece device further comprises:
    a second harness hook wherein the wire harness is placed within the second harness hook.

4. The vehicle of claim 1 wherein the vehicle door assembly further comprises:
    the one-piece device comprising a second switch mount; and,
    a second switch that is mounted to the second switch mount.

5. The vehicle of claim 1 wherein the one-piece device is formed in a molding process.

6. The vehicle of claim 1 wherein the connection member is heat staked to the vehicle door assembly.

7. The vehicle of claim 1 wherein the connection member is connected to an inside surface of an inner panel of the vehicle door assembly.

8. The vehicle of claim 1 wherein the vehicle door assembly further comprises:
    a pocket having a pocket surface wherein the one-piece device is fastened to the pocket surface.

9. The vehicle of claim 8 wherein the one-piece device further comprises:
    a fastener aperture wherein the one-piece device is fastened to the pocket surface by inserting a fastener through the fastener aperture.

10. A vehicle door assembly comprising:
    a door body;
    an inner panel; and,
    a one-piece device comprising:
        (a) a harness hook;
        (b) a switch mount; and,
        (c) a connection member that is connected to the vehicle door assembly; and,
    a switch that is mounted to the switch mount, the switch having a wire harness that is connected to the switch and that is placed within the harness hook.

11. The vehicle door assembly of claim 10 wherein the connection member is connected to the inner panel.

12. A vehicle door assembly comprising:
    a door body;
    an inner panel; and,
    a one-piece device comprising:
        (a) a harness hook;
        (b) a switch mount; and,
        (c) a connection member that is connected to the vehicle door assembly;
    a switch mounted to the switch mount, the switch having a wire harness that is connected to the switch and that is placed within the harness hook; and,
    a conventional routing control device, wherein a portion of the wire harness is placed within the conventional routing control device.

13. The vehicle door assembly of claim 12 wherein the switch is a fuel lid switch.

14. The vehicle door assembly of claim 12 wherein the one-piece device further comprises:
    a second harness hook wherein the wire harness is placed within the second harness hook.

15. The vehicle door assembly of claim 12 wherein the one-piece device further comprises a second switch mount, and wherein the vehicle door assembly further comprises a second switch mounted to the second switch mount.

16. The vehicle door assembly of claim 12 wherein the one-piece device is formed in a molding process.

17. The vehicle door assembly of claim 12 wherein the connection member is heat staked to the vehicle door assembly.

18. The vehicle door assembly of claim 12 wherein the connection member is connected to an inside surface of an inner panel of the vehicle door assembly.

19. The vehicle door assembly of claim 12 further comprising:
a pocket having a pocket surface wherein the one-piece device is fastened to the pocket surface.

20. The vehicle door assembly of claim 19 wherein the one-piece device further comprises:
a fastener aperture, wherein the one-piece device is fastened to the pocket surface by inserting a fastener through the fastener aperture.

* * * * *